(12) United States Patent
Hirano et al.

(10) Patent No.: US 12,291,113 B2
(45) Date of Patent: May 6, 2025

(54) VEHICLE ALLOCATION APPARATUS AND VEHICLE ALLOCATION METHOD

(71) Applicant: TOYOTA JIDOSHA KABUSHIKI KAISHA, Toyota (JP)

(72) Inventors: Takahiro Hirano, Gotemba (JP); Shogo Tsuge, Fuji (JP); Ryosuke Ikemura, Susono (JP); Yohei Arino, Nagoya (JP); Masaki Ito, Toyota (JP); Yuki Takahashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 174 days.

(21) Appl. No.: 17/817,368

(22) Filed: Aug. 4, 2022

(65) Prior Publication Data

US 2023/0055398 A1 Feb. 23, 2023

(30) Foreign Application Priority Data

Aug. 18, 2021 (JP) ................. 2021-133371

(51) Int. Cl.
*B60L 53/126* (2019.01)
*B60L 53/53* (2019.01)
*B60L 53/62* (2019.01)
*B60L 53/66* (2019.01)

(52) U.S. Cl.
CPC ............ *B60L 53/126* (2019.02); *B60L 53/53* (2019.02); *B60L 53/62* (2019.02); *B60L 53/66* (2019.02)

(58) Field of Classification Search
CPC ........... B60L 2240/622; B60L 2240/72; B60L 53/12; B60L 53/126; B60L 53/14; B60L 53/305; B60L 53/53; B60L 53/62; B60L 53/65; B60L 53/66; Y02T 10/70; Y02T 10/7072; Y02T 90/14
See application file for complete search history.

(56) References Cited

U.S. PATENT DOCUMENTS

| | | | | |
|---|---|---|---|---|
| 11,898,856 | B2* | 2/2024 | Gerrese | G01C 21/3438 |
| 2017/0136892 | A1* | 5/2017 | Ricci | H02J 50/10 |
| 2017/0136893 | A1* | 5/2017 | Ricci | B60L 53/126 |
| 2017/0140349 | A1* | 5/2017 | Ricci | B60L 53/63 |
| 2019/0039467 | A1* | 2/2019 | Hortop | H02J 7/0071 |

(Continued)

FOREIGN PATENT DOCUMENTS

| | | | |
|---|---|---|---|
| CN | 104300657 A | * | 1/2015 |
| CN | 205017057 U | * | 2/2016 |

(Continued)

*Primary Examiner* — Babar Sarwar
(74) *Attorney, Agent, or Firm* — Finnegan, Henderson, Farabow, Garrett and Dunner, LLP

(57) ABSTRACT

A processor obtains power reception information including information on a power reception form of a power reception apparatus of each of a plurality of vehicles. The processor obtains power transmission information including information on a power transmission form of a power transmission apparatus available on a travel path through which each of the plurality of vehicles can travel. The processor selects as a vehicle to be dispatched from among the plurality of vehicles, a vehicle that can receive electric power from the power transmission apparatus on the travel path, based on the power reception information and the power transmission information.

6 Claims, 9 Drawing Sheets

(56) References Cited

U.S. PATENT DOCUMENTS

2022/0126710 A1\* 4/2022 Ward .................. B60L 53/12
2023/0004901 A1\* 1/2023 Shaotran ............. B60L 50/60
2023/0046454 A1\* 2/2023 Holmes ............... B60L 53/62

FOREIGN PATENT DOCUMENTS

| CN | 107176045 | A | \* | 9/2017 | ............. B60L 53/12 |
| CN | 107253446 | A | \* | 10/2017 | ............. B60L 50/50 |
| CN | 107571753 | A | \* | 1/2018 | |
| CN | 208682632 | U | \* | 4/2019 | ............. H02J 50/10 |
| CN | 110807613 | A | \* | 2/2020 | ........... G06Q 10/083 |
| JP | 2012073979 | A | \* | 4/2012 | |
| WO | WO-2019225046 | A1 | \* | 11/2019 | |

\* cited by examiner

<GROUP OF DISPATCH CANDIDATE VEHICLES>

|  | VEHICLE A | VEHICLE B | VEHICLE C | VEHICLE D | VEHICLE E |
|---|---|---|---|---|---|
| CONTACT POWER RECEPTION APPARATUS | ○ | ○ | | | |
| WIRELESS POWER RECEPTION APPARATUS | | | ○ | ○ | ○ |
| 3kW | ○ | | ○ | | |
| 10kW | | ○ | | ○ | |
| 30kW | | | | | ○ |

VEHICLE ALLOCATION APPARATUS AND VEHICLE ALLOCATION METHOD

This nonprovisional application is based on Japanese Patent Application No. 2021-133371 filed with the Japan Patent Office on Aug. 18, 2021, the entire contents of which are hereby incorporated by reference.

BACKGROUND

Field

The present disclosure relates to a vehicle allocation apparatus and a vehicle allocation method that select a vehicle to be dispatched from among a plurality of vehicles on standby.

Description of the Background Art

WO2019/225046 discloses a vehicle allocation apparatus that determines, when candidate vehicles to be dispatched to a user include an electric vehicle, whether to adopt the electric vehicle as the candidate vehicle, based on remaining battery power of the electric vehicle and an amount of power consumption necessary for travel from a current position of the electric vehicle via a position where the user gets on the vehicle to a destination of the user.

SUMMARY

According to the vehicle allocation apparatus in WO2019/225046, when there is a power transmission apparatus on a travel path through which a vehicle to be a dispatch candidate will travel, the vehicle can be charged with the use of the power transmission apparatus.

When electric power (for example, 3 kW) received by a power reception apparatus is lower than electric power (for example, 30 kW) transmitted by the power transmission apparatus, however, charging efficiency is poor. In addition, when a form of power transmission by the power transmission apparatus is different from a form of power reception by the power reception apparatus as in an example where a wireless power transmission apparatus is located on the travel path whereas a contact power reception apparatus is mounted on the vehicle, the vehicle cannot be charged on the travel path.

The present disclosure was made to solve the problem above, and an object of the present disclosure is to provide a vehicle allocation apparatus and a vehicle allocation method that allocate a vehicle that can suitably receive electric power from a power transmission apparatus on a travel path.

A vehicle allocation apparatus according to a first point of view of the present disclosure is an apparatus that selects a vehicle to be dispatched from among a plurality of vehicles on standby. The vehicle allocation apparatus includes a processor and a memory in which a program executable by the processor is stored. Each of the plurality of vehicles includes a power reception apparatus configured to receive electric power from a power transmission apparatus and a battery for traveling that is charged with electric power received by the power reception apparatus. The power transmission apparatus includes a contact power transmission apparatus configured to transmit electric power through a charging cable and a wireless power transmission apparatus configured to wirelessly transmit electric power. The power reception apparatus includes at least one of a contact power reception apparatus that receives electric power from the contact power transmission apparatus and a wireless power reception apparatus that receives electric power from the wireless power transmission apparatus. The processor obtains power reception information including information on a power reception form of the power reception apparatus of each of the plurality of vehicles. The processor obtains power transmission information including information on a power transmission form of the power transmission apparatus available on a travel path through which each of the plurality of vehicles can travel. The processor selects as the vehicle to be dispatched from among the plurality of vehicles, a vehicle that can receive electric power from the power transmission apparatus on the travel path, based on the power reception information and the power transmission information.

In the configuration, a vehicle that can receive electric power from the power transmission apparatus on the travel path is selected as the vehicle to be dispatched, based on the power reception information including information on the power reception form of the power reception apparatus and the power transmission information including information on the power transmission form of the power transmission apparatus. Thus, according to the configuration, the vehicle that can suitably receive electric power from the power transmission apparatus on the travel path can be dispatched.

The power reception information may include information indicating electric power received per unit time by the power reception apparatus. The power transmission information may include information indicating electric power transmitted per unit time by the power transmission apparatus. According to such a configuration, in consideration of relation between electric power received per unit time by the power reception apparatus and electric power transmitted per unit time by the power transmission apparatus, charging from the power transmission apparatus to the power reception apparatus can efficiently be carried out.

The processor may be configured to select as the vehicle to be dispatched from among the plurality of vehicles, a vehicle in which electric power received per unit time by the power reception apparatus matches with electric power transmitted per unit time by the power transmission apparatus. According to such a configuration, charging from the power transmission apparatus to the power reception apparatus can efficiently be carried out.

The processor may be configured to select the vehicle to be dispatched when a user makes a vehicle dispatch request. The travel path may be configured to be a path to a location where the user gets on the dispatched vehicle. According to such a configuration, a vehicle that can suitably receive electric power from the power transmission apparatus on the path to the location where the user gets on the dispatched vehicle can be dispatched.

The processor may be configured to exclude from candidates for the vehicle to be dispatched, a vehicle among the plurality of vehicles that will arrive later than time designated by the user at the location where the user gets on the dispatched vehicle. According to such a configuration, a vehicle that will arrive by the time designated by the user can reliably be dispatched.

The processor may be configured to select as the vehicle to be dispatched, a vehicle shortest in travel distance to the location where the user gets on the dispatched vehicle when there are vehicles that can be selected as the vehicle to be dispatched. According to such a configuration, the travel distance is shorter, so that deterioration of a battery mounted on the vehicle can be suppressed.

A vehicle allocation method according to a second point of view of the present disclosure is a method of selecting a vehicle to be dispatched from among a plurality of vehicles on standby. The vehicle allocation method includes obtaining power reception information including information on a power reception form of a power reception apparatus of each of the plurality of vehicles, obtaining power transmission information including information on a power transmission form of a power transmission apparatus available on a travel path through which each of the plurality of vehicles can travel, and selecting as the vehicle to be dispatched from among the plurality of vehicles, a vehicle that can receive electric power from the power transmission apparatus on the travel path, based on the power reception information and the power transmission information. According to the vehicle allocation method as well, a vehicle that can suitably receive electric power from the power transmission apparatus on the travel path can be dispatched.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
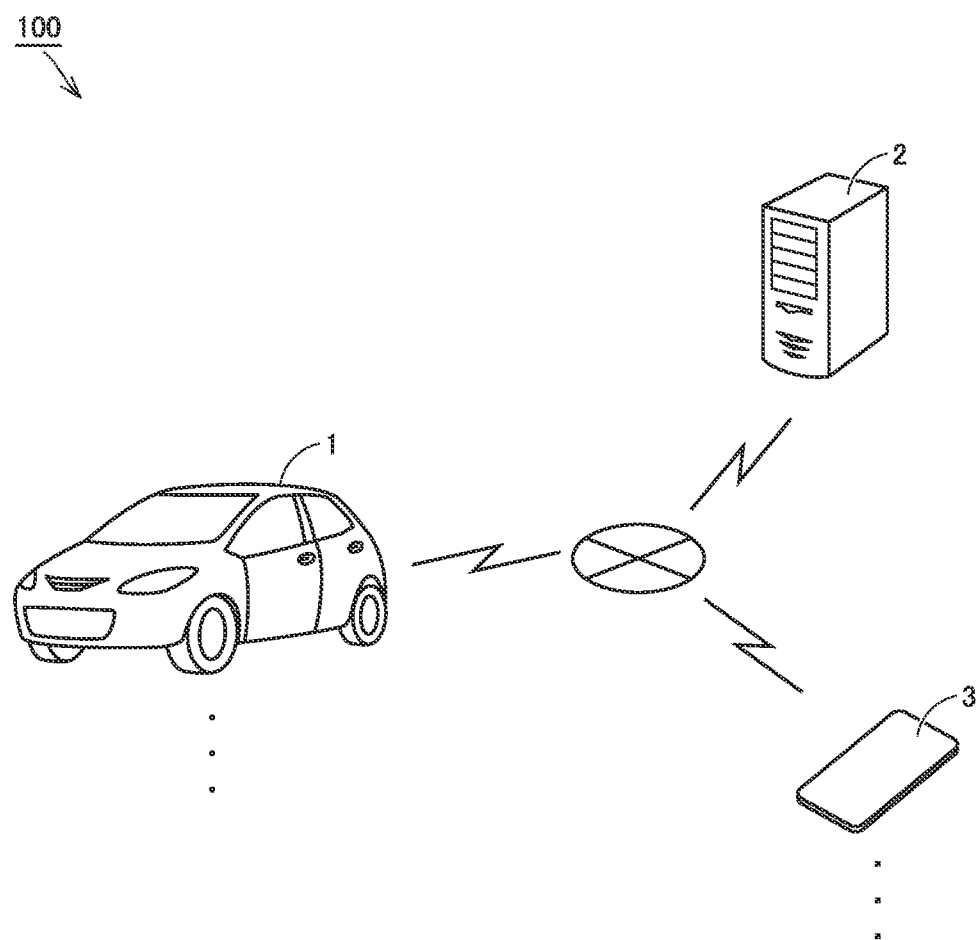
FIG. 1 is a diagram schematically showing an overall configuration of a vehicle allocation system according to an embodiment of the present disclosure.

An embodiment of the present disclosure will be described in detail below with reference to the drawings. The same or corresponding elements in the drawings have the same reference characters allotted and description thereof will not be repeated.

Embodiment

<System Configuration>

FIG. 1 is a diagram schematically showing an overall configuration of a vehicle allocation system 100 according to an embodiment of the present disclosure. Vehicle allocation system 100 includes a plurality of vehicles 1 (including vehicles 1a to 1g which will be described later), a vehicle allocation apparatus 2, and a plurality of user terminals 3.

Figure 3:
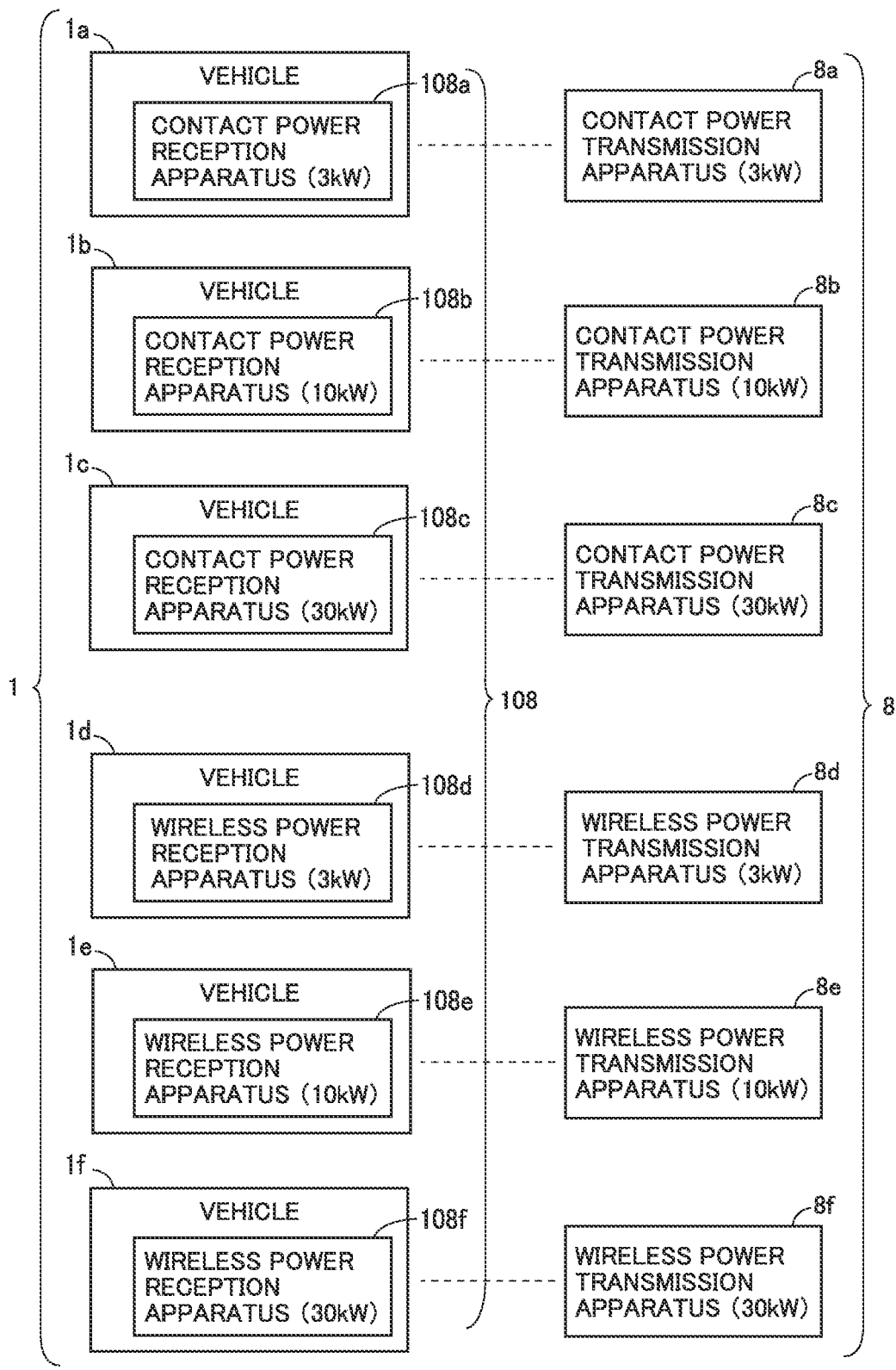
FIG. 3 is a diagram for illustrating combination between a power transmission apparatus and a power reception apparatus.
Figure 4:
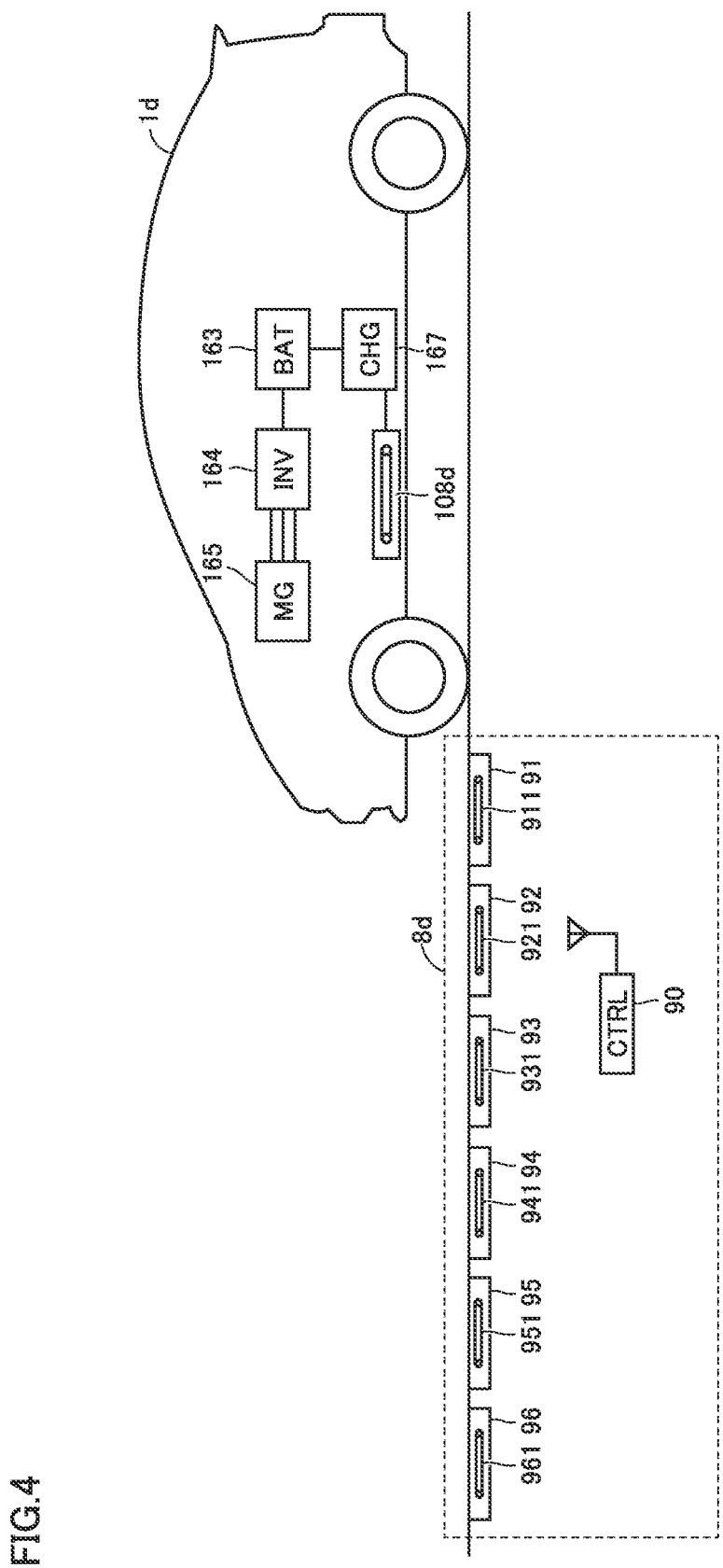
FIG. 4 is a diagram schematically showing an exemplary configuration of a vehicle including a wireless power reception apparatus and a wireless power transmission apparatus.
Figure 5:
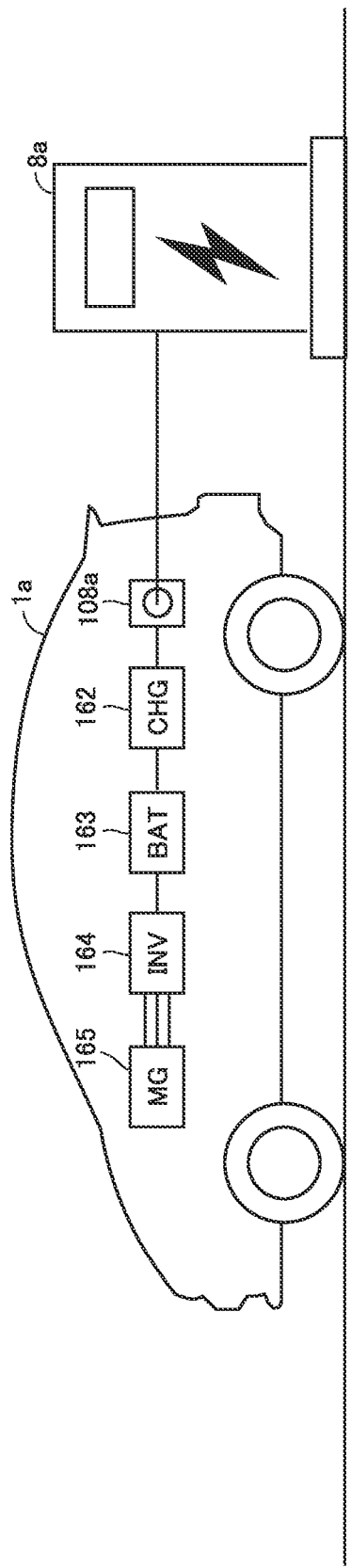
FIG. 5 is a diagram schematically showing an exemplary configuration of a vehicle including a contact power reception apparatus and a contact power transmission apparatus.

Each of the plurality of vehicles 1 is an electrically powered vehicle incorporating a battery for traveling, and it is, for example, a battery electric vehicle (BEV) or a plug-in hybrid electric vehicle (PHEV). Each of the plurality of vehicles 1 can be charged through contact charging or wireless charging by a power transmission apparatus 8 (FIGS. 3 to 5).

Vehicle allocation apparatus 2 is a server apparatus. Vehicle allocation apparatus 2 is an apparatus that selects a vehicle to be dispatched from among the plurality of vehicles 1 on standby. Latest road information and latest information on power transmission apparatus 8 are held in vehicle allocation apparatus 2. A detailed configuration of vehicle allocation apparatus 2 will be described with reference to FIG. 2.

Each of the plurality of user terminals 3 is a terminal operated by a user, and it is, for example, a smartphone. The user can issue a vehicle dispatch request to vehicle allocation apparatus 2 by operating user terminal 3. Vehicle allocation apparatus 2 selects a vehicle to be dispatched to the user based on this vehicle dispatch request. Vehicle 1, vehicle allocation apparatus 2, and user terminal 3 are configured to bidirectionally communicate with each other over a network such as the Internet.

Figure 2:
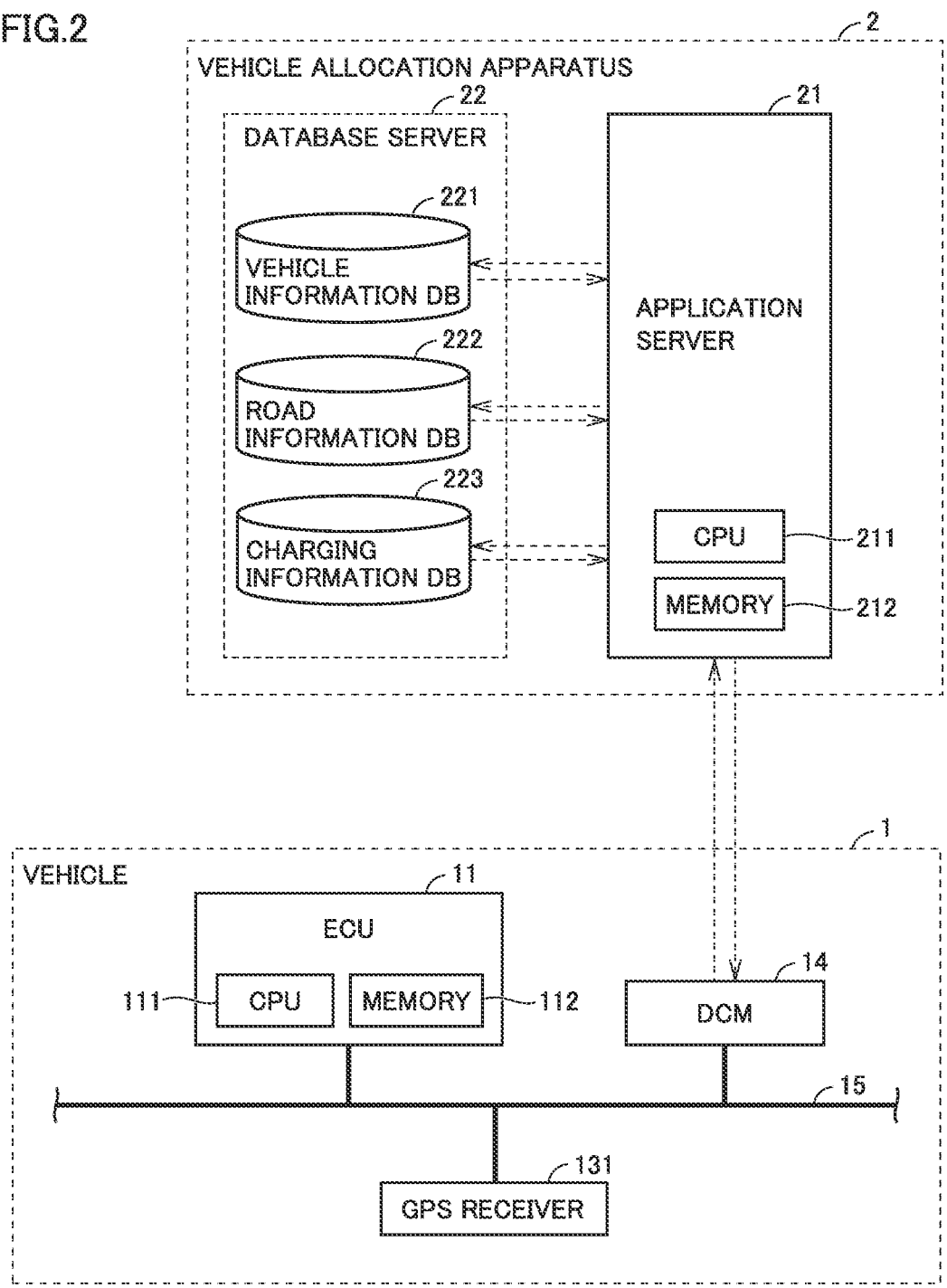
FIG. 2 is a diagram showing in detail, a configuration of a vehicle and a vehicle allocation apparatus.

FIG. 2 is a diagram showing in detail, a configuration of vehicle 1 and vehicle allocation apparatus 2. Vehicle 1 includes an electronic control unit (ECU) 11, a global positioning system (GPS) receiver 131, and a communication module 14. ECU 11, GPS receiver 131, and communication module 14 can communicate with one another over a vehicle-mounted network 15 such as a controller area network (CAN).

ECU 11 includes a processor 111 such as a central processing unit (CPU) and a memory 112 such as a read only memory (ROM) and a random access memory (RAM). Processor 111 is configured to perform prescribed computing processing described in a program. A program executed by processor 1 is stored in memory 112. Data generated by execution of a program by processor 111 and data provided via communication module 14 are temporarily stored in memory 112. ECU 11 controls each device in vehicle 1 such that vehicle 1 is in a desired state, based on detection values from various sensors (not shown) and a program stored in memory 112 ECU 11 generates various types of information transmitted and received to and from vehicle allocation apparatus 2.

GPS receiver 131 specifies a position of vehicle 1 based on radio waves from an artificial satellite (not shown). Vehicle 1 transmits position information (GPS information) of vehicle 1 specified by GPS receiver 131 to vehicle allocation apparatus 2.

Communication module 14 is a vehicle-mounted data communication module (DCM) and configured such that ECU 11 and vehicle allocation apparatus 2 bidirectionally communicate with each other.

Vehicle allocation apparatus 2 includes an application server 21 and a database server 22. Database server 22 includes a vehicle information database 221, a road information database 222, and a charging information database 223.

Application server 21 includes a processor 211 and a memory 212. A program executable by processor 211 is stored in memory 212.

Application server 21 collects information such as position information (GPS information) and state-of-charge (SOC) information of each of the plurality of vehicles 1. The information is regularly transmitted from each vehicle 1 to vehicle allocation apparatus 2. Application server 21 has the collected information stored in vehicle information database 221. Information on a type, a model year, a model, specifications, and a state (for example, a state of deterioration and a full charge capacity of a battery) of each vehicle 1 and information on power reception information (which will be described later) of a power reception apparatus 108 are also stored in vehicle information database 221.

Application server 21 may obtain records of travel of each vehicle 1 or more specifically data on power consumption measured during travel of each vehicle 1 for each of various travel conditions (a travel path, a date, day of the week, weather, an air temperature, or the like) and have them stored in vehicle information database 221.

Road information is stored in road information database 222. Power transmission information (which will be described later) of power transmission apparatus 8 on specifications and a location of placement of power transmission apparatus 8 is stored in charging information database 223. The road may newly be constructed or a geometry of the road may be changed. In addition, power transmission apparatus 8 may newly be placed or existing power transmission apparatus 8 may be decommissioned. Therefore, information stored in road information database 222 and charging information database 223 is regularly updated to a latest state by a manager of vehicle allocation apparatus 2.

<Combination Between Power Transmission Apparatus 8 and Power Reception Apparatus 108>

FIG. 3 is a diagram for illustrating combination between power transmission apparatus 8 and power reception apparatus 108.

In the present embodiment, power transmission apparatus 8 includes contact power transmission apparatuses 8a to 8c and wireless power transmission apparatuses 8d to 8f. Contact power transmission apparatuses 8a to 8c are each configured to transmit electric power through a charging cable. Wireless power transmission apparatuses 8d to 8f are each configured to wirelessly transmit electric power.

Power reception apparatus 108 includes contact power reception apparatuses 108a to 108c and wireless power reception apparatuses 108d to 108f. Vehicle 1 may incorporate only a contact power reception apparatus, incorporate only a wireless power reception apparatus, or incorporate both of a contact power reception apparatus and a wireless power reception apparatus. The contact power reception apparatus receives electric power from the contact power transmission apparatus. The wireless power reception apparatus receives electric power from the wireless power transmission apparatus.

Each of the plurality of vehicles 1 is configured to be chargeable by at least one of contact charging through the charging cable that extends from contact power transmission apparatuses 8a to 8c and wireless charging by wireless power transmission apparatuses 8d to 8f.

Vehicle 1a includes contact power reception apparatus 108a. Contact power reception apparatus 108a receives 3 kW of electric power per unit time (which is also referred to as "received power" below) (contact power reception apparatus 108a also being referred to as a "contact power reception apparatus (3 kW)" below). In the present embodiment, contact power transmission apparatus 8a is used to transmit electric power to contact power reception apparatus 108a. Contact power transmission apparatus 8a transmits 3 kW of electric power per unit time (which is also referred to as "transmitted power" below) (contact power transmission apparatus 8a also being referred to as a "contact power transmission apparatus (3 kW)" below).

Vehicle 1b includes contact power reception apparatus 108b. Contact power reception apparatus 108b receives 10 kW of received power (contact power reception apparatus 108b also being referred to as a "contact power reception apparatus (10 kW)" below), in the present embodiment, contact power transmission apparatus 8b is used to transmit electric power to contact power reception apparatus 108b. Contact power transmission apparatus 8b transmits 10 kW of transmitted power (contact power transmission apparatus 8b also being referred to as a "contact power transmission apparatus (10 kW)" below).

Vehicle 1c includes contact power reception apparatus 108c. Contact power reception apparatus 108c receives 30 kW of received power (contact power reception apparatus 108c also being referred to as a "contact power reception apparatus (30 kW)" below). In the present embodiment, contact power transmission apparatus 8c is used to transmit electric power to contact power reception apparatus 108c. Contact power transmission apparatus 8c transmits 30 kW of transmitted power (contact power transmission apparatus 8c also being referred to as a "contact power transmission apparatus (30 kW)" below).

Vehicle 1d includes wireless power reception apparatus 108d. Wireless power reception apparatus 108d receives 3 kW of received power (wireless power reception apparatus 108d also being referred to as a "wireless power reception apparatus (3 kW)" below). In the present embodiment, wireless power transmission apparatus 8d is used to transmit electric power to wireless power reception apparatus 108d. Wireless power transmission apparatus 8d transmits 3 kW of transmitted power (wireless power transmission apparatus 8d also being referred to as a "wireless power transmission apparatus (3 kW)" below).

Vehicle 1e includes wireless power reception apparatus 108e. Wireless power reception apparatus 108e receives 10 kW of received power (wireless power reception apparatus 108e also being referred to as a "wireless power reception apparatus (10 kW)" below). In the present embodiment, wireless power transmission apparatus 8e is used to transmit electric power to wireless power reception apparatus 108e. Wireless power transmission apparatus 8e transmits 10 kW of transmitted power (wireless power transmission apparatus 8e also being referred to as a "wireless power transmission apparatus (10 kW)" below).

Vehicle 1f includes wireless power reception apparatus 108f. Wireless power reception apparatus 108f receives 30 kW of received power (wireless power reception apparatus 108f also being referred to as a "wireless power reception apparatus (30 kW)" below). In the present embodiment, wireless power transmission apparatus 8f is used to transmit electric power to wireless power reception apparatus 108f. Wireless power transmission apparatus 8f transmits 30 kW of transmitted power (wireless power transmission apparatus 8f also being referred to as a "wireless power transmission apparatus (30 kW)" below).

As set forth above, in the present embodiment, the contact power reception apparatus and the contact power transmission apparatus are combined with each other, or the wireless power reception apparatus and the wireless power transmission apparatus are combined with each other. Furthermore, the power transmission apparatus and the power reception apparatus are combined such that electric power matches between a power transmission side and a power reception side (combination between the power transmission apparatus and the power reception apparatus adapted to 3 kW, between the power transmission apparatus and the power reception apparatus adapted to 10 kW, and between the power transmission apparatus and the power reception apparatus adapted to 30 kW). The reason for doing so is that combination of the wireless power reception apparatus (3 kW), for example, with the wireless power transmission apparatus (30 kW) causes waste of electric power of 27 kW (=30−3) in charging and charging efficiency is poor. Specific examples of combination between power reception apparatus 108 and power transmission apparatus 8 will be described below.

<Wireless Charging>

FIG. 4 is a diagram schematically showing an exemplary configuration of vehicle 1*d* including wireless power reception apparatus 108*d* (wireless power reception apparatus (3 kW)) and wireless power transmission apparatus 8*d* (wireless power transmission apparatus (3 kW)). Vehicle 1*d* further includes wireless power reception apparatus 108*d*, a power conversion device 167, a battery 163 for traveling, an inverter 164, and a motor generator 165 in addition to components shown in FIG. 2.

Wireless power reception apparatus 108*d* is arranged on a lower surface of a floor panel that forms a bottom surface of vehicle 1*d*. A power reception coil is accommodated in wireless power reception apparatus 108*d*. The power reception coil wirelessly receives electric power transmitted from wireless power transmission apparatus 8*d*.

Wireless power transmission apparatus 8*d* includes a plurality of power transmission units 91 to 96 and a controller 90. Though FIG. 4 shows an example in which six power transmission units are provided, the number of power transmission units is not particularly limited and a larger number of power transmission units may be provided.

The plurality of power transmission units 91 to 96 are arranged in line in a travel lane (which may be a road surface or a sidewall) of vehicle 1*d*. The plurality of power transmission units 91 to 96 include power transmission coils 911 to 961, respectively. Power transmission coils 911 to 961 are electrically connected to an alternating-current (AC) power supply (not shown). Though not shown, each of the plurality of power transmission units 91 to 96 is provided with a sensor (an optical sensor, a weight sensor, or the like) that detects passage of vehicle 1*d*.

Controller 90 specifies a position of traveling of vehicle 1*d* based on a detection signal from each sensor. Then, controller 90 has AC power from the AC power supply supplied to a power transmission coil in a power transmission unit above which vehicle 1*d* is located, among power transmission units 91 to 96.

More specifically, when vehicle 1*d* is detected, for example, above power transmission unit 91, controller 90 has AC power supplied to power transmission coil 911. Then, an AC current flows through power transmission coil 911, so that electromagnetic field is formed around power transmission coil 911. The power reception coil within wireless power reception apparatus 108*d* wirelessly receives electric power through the electromagnetic field. Thereafter, when vehicle 1*d* is no longer detected above power transmission unit 91, controller 90 stops supply of AC power to power transmission coil 911. As such a series of control is carried out for each of power transmission units 91 to 96, electric power can wirelessly be transmitted to traveling vehicle 1*d* (wireless charging).

Wireless power reception apparatus 108*d* supplies electric power from wireless power transmission apparatus 8*d* to battery 163 through power conversion device 167. Battery 163 is a battery assembly including a plurality of cells. Each cell is a secondary battery such as a lithium ion battery or a nickel metal hydride battery. Battery 163 supplies electric power for generating driving force of vehicle 1 to motor generator 165. Electric power generated by motor generator 165 is stored in battery 163. Battery 163 is provided with a voltage sensor and a current sensor (neither of which is shown) for calculation of an SOC of battery 163 by ECU 11.

Inverter 164 converts direct-current (DC) power stored in battery 163 to AC power and supplies resultant AC power to motor generator 165. Inverter 164 converts AC power (regenerative power) from motor generator 165 to DC power so that battery 163 is charged with DC power. Inverter 164 further converts AC power received by wireless power reception apparatus 108*d* to DC power so that battery 163 is charged with DC power.

Motor generator 165 has vehicle 1*d* travel by receiving supply of electric power from inverter 164 and providing rotational force to a drive wheel.

Though the exemplary configuration of vehicle 1*d* including wireless power reception apparatus 108*d* and wireless power transmission apparatus 8*d* is shown above, the configuration of vehicle 1*e* including wireless power reception apparatus 108*e* and wireless power transmission apparatus 8*e* and the configuration of vehicle 1*f* including wireless power reception apparatus 108*f* and wireless power transmission apparatus 8*f* are merely different in power transmission apparatus and power reception apparatus, and the configuration is otherwise similar.

<Contact Charging>

FIG. 5 is a diagram schematically showing an exemplary configuration of vehicle 1*a* including contact power reception apparatus 108*a* (contact power reception apparatus (3 kW)) and contact power transmission apparatus 8*a* (a contact transmission apparatus (3 kW)).

Contact power reception apparatus (which is also referred to as an "inlet") 108*a* is arranged in the inside of a charge lid (not shown) provided in an exterior of vehicle 1*a*. Contact power reception apparatus 108*a* is constructed such that a charging connector provided at a tip end of the charging cable that extends from contact power transmission apparatus 8*a* can be inserted therein. As the charging connector is inserted in contact power reception apparatus 108*a*, contact power transmission apparatus 8*a* and contact power reception apparatus 108*a* are electrically connected to each other and electric power can be transmitted from contact power transmission apparatus 8*a* to vehicle 1*a* (contact charging).

When AC power is supplied from contact power transmission apparatus 8*a*, a power conversion device 162 converts AC power into DC power and supplies DC power to battery 163. Battery 163 supplies electric power for generating driving force of vehicle 1*a* to motor generator 165. Inverter 164 converts DC power stored in battery 163 into AC power and supplies AC power to motor generator 165. Motor generator 165 has vehicle 1*a* travel by receiving supply of electric power from inverter 164 and providing rotational force to a drive wheel.

Though the exemplary configuration of vehicle 1*a* including contact power reception apparatus 108*a* and contact power transmission apparatus 8*a* is shown above, the configuration of vehicle 1*b* including contact power reception apparatus 108*b* and contact power transmission apparatus 8*b* and the configuration of vehicle 1*c* including contact power reception apparatus 108*c* and contact power transmission apparatus 8c are also similar except for the power transmission apparatus and the power reception apparatus.

<Candidate for Travel Path>

Figure 6:
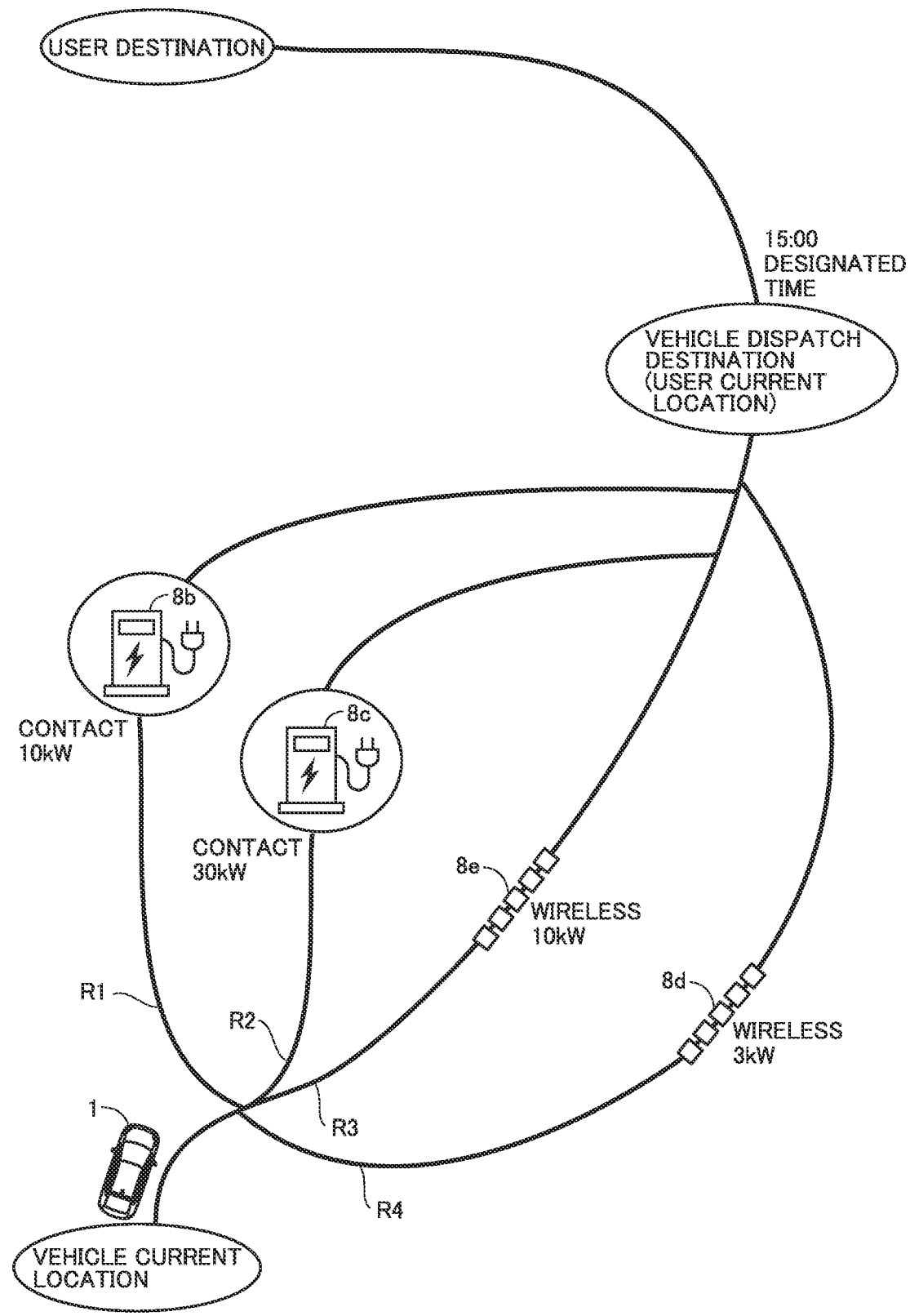
FIG. 6 is a diagram showing an exemplary candidate for a travel path of the vehicle in the present embodiment.

FIG. 6 is a diagram showing an exemplary candidate for a travel path of vehicle 1 in the present embodiment. This example shows candidates (travel paths R1 to R4) for the travel path from a current location to a destination of vehicle 1.

In the present embodiment, the current location of vehicle 1 is also referred to as a "vehicle current location." The current location of a user is also referred to as a "user current location" or a "vehicle dispatch destination." A destination of the user is also referred to as a "user destination."

The user at the user current location (vehicle dispatch destination) issues a vehicle dispatch request to vehicle allocation apparatus 2 by using user terminal 3. Vehicle allocation apparatus 2 selects a travel path (any one of travel paths R1 to R4 in the present example) and a vehicle to be dispatched from among a plurality of vehicles 1. The vehicle to be dispatched travels from the vehicle current location to the vehicle dispatch destination for pick-up of the user at the vehicle dispatch destination. Thereafter, the dispatched vehicle travels to the user destination to drop off the user. In issuing the vehicle dispatch request, the user designates arrival of the dispatched vehicle at the vehicle dispatch destination by designated time (15:00 in the present example).

The "travel path" described above refers to a path from the current location to a destination of vehicle 1. The destination in this case, however, refers to the "vehicle dispatch destination." In other words, the travel path refers to a path to a location (vehicle dispatch destination) where the user gets on the vehicle. Without being limited as such, the "travel path" may refer to a path from the current location of vehicle 1 to the user destination. In this case, the dispatched vehicle may be designated to arrive at the user destination by the designated time.

At some position on travel path R1, contact power transmission apparatus 8b (contact power transmission apparatus (10 kW)) is placed. At some position on travel path R2, contact power transmission apparatus 8c (contact power transmission apparatus (30 kW)) is placed. In the travel lane on travel path R3, wireless power transmission apparatus 8e (wireless power transmission apparatus (10 kW)) is placed. In the travel lane on travel path R4, wireless power transmission apparatus 8d (wireless power transmission apparatus (3 kW)) is placed <Processing Flow>

Figure 7:
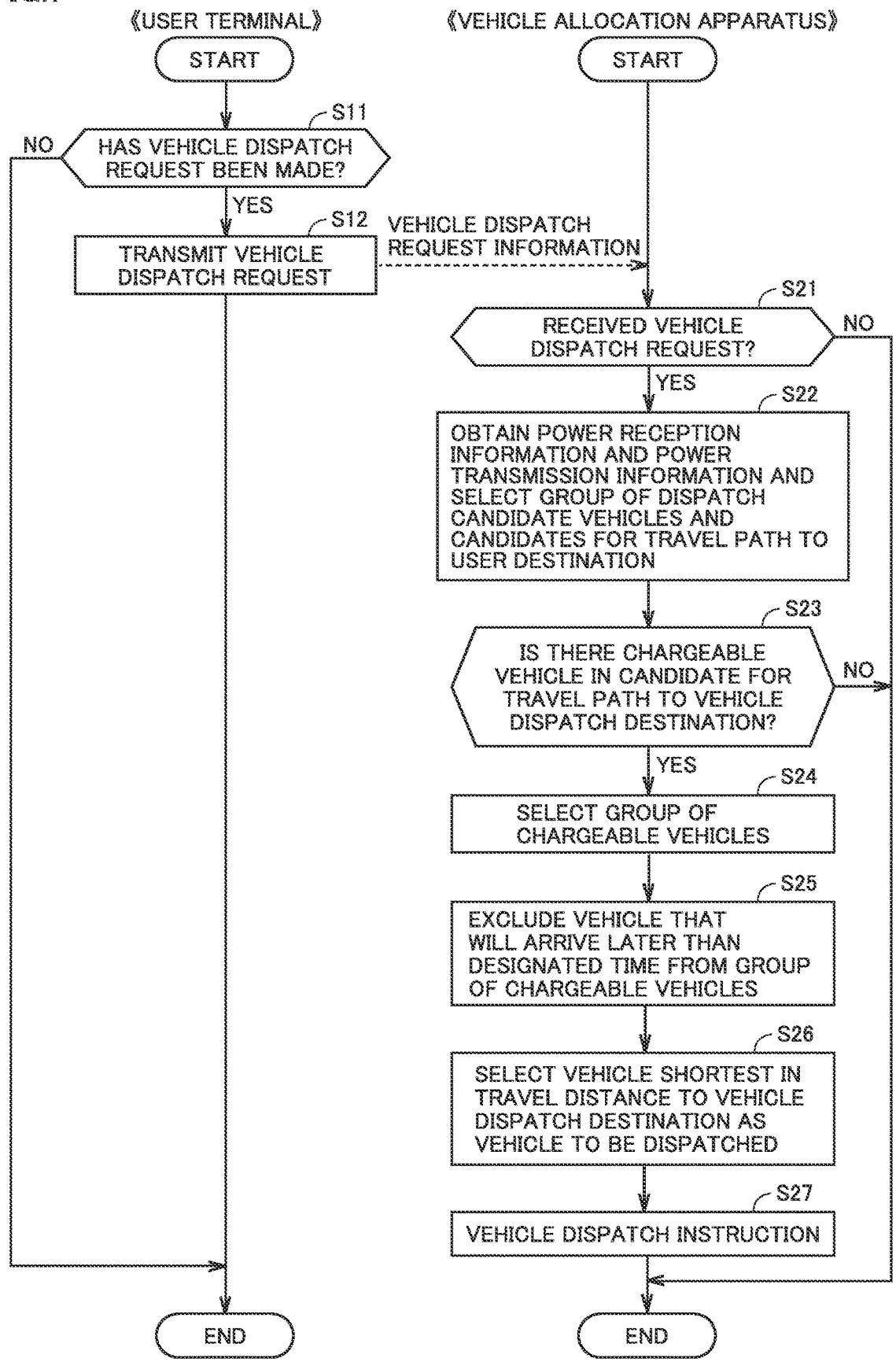
FIG. 7 is a flowchart showing a processing procedure in vehicle allocation processing in the present embodiment.

A processing procedure in vehicle allocation processing will be described below with reference to a flowchart. FIG. 7 is a flowchart showing the processing procedure in vehicle allocation processing in the present embodiment. This flowchart is performed, for example, by being invoked from a main routine (not shown) when a predetermined condition is satisfied.

In the figure, processing performed by user terminal 3 is shown on the left and processing performed by vehicle allocation apparatus 2 (application server 21) is shown on the right. Though each step is performed by software processing by vehicle allocation apparatus 2 or user terminal 3, it may be performed by hardware such as a large scale integration (LST) arranged in vehicle allocation apparatus 2 or user terminal 3. The step will be abbreviated as S below.

In S11, user terminal 3 determines whether or not a vehicle dispatch request has been made. For example, in the example in FIG. 6, the user makes the vehicle dispatch request from the user current location (vehicle dispatch destination) by using user terminal 3. At that time, the user is assumed to designate arrival at the vehicle dispatch destination by 15:00.

When the vehicle dispatch request has been made (YES in S11), in S12, user terminal 3 transmits the vehicle dispatch request to vehicle allocation apparatus 2. When the vehicle dispatch request has not been made (NO in S11), user terminal 3 has the process return to the main routine.

Vehicle allocation apparatus 2 (processor 211) selects as the vehicle to be dispatched from among the plurality of vehicles 1, vehicle 1 that can receive electric power from power transmission apparatus 8 on the travel path, based on power reception information and power transmission information. Specific processing steps will be described below.

In S21, vehicle allocation apparatus 2 (processor 211) determines whether or not it has received the vehicle dispatch request. When vehicle allocation apparatus 2 has received the vehicle dispatch request (YES in S21), in S22, vehicle allocation apparatus 2 obtains the power reception information and the power transmission information, and selects a group of dispatch candidate vehicles and candidates for the travel path to the user destination. When vehicle allocation apparatus 2 does not receive the vehicle dispatch request (NO in S21), vehicle allocation apparatus 2 has the process return to the main routine.

The power reception information is information including information on the power reception form of power reception apparatus 108 of each of the plurality of vehicles 1. Information on the power reception form is information, based on which whether power reception apparatus 108 falls under the contact power reception apparatus or the wireless power reception apparatus can be specified. The power reception information includes information indicating received power (any one of 3 kW, 10 kW, and 30 kW) received by power reception apparatus 108. In other words, whether power reception apparatus 108 falls under contact power reception apparatuses 108a to 108c or wireless power reception apparatuses 108d to 108f can be specified based on the power reception information.

The power transmission information is information including information on the power transmission form of power transmission apparatus 8 available on the travel path through which each of the plurality of vehicles 1 can travel. The information on the power transmission form is information, based on which whether power transmission apparatus 8 falls under the contact power transmission apparatus or the wireless power transmission apparatus can be specified. The power transmission information includes information indicating transmitted power (any one of 3 kW, 10 kW, and 30 kW) transmitted from power transmission apparatus 8. In other words, whether power transmission apparatus 8 falls under contact power transmission apparatuses 8a to 8c or wireless power transmission apparatuses 8d to 8f can be specified based on the power transmission information.

In the example in FIG. 6, travel paths R1 to R4 are selected as the candidates for the travel path. A plurality of candidates for the travel path may be selected based on a status of placement of power transmission apparatus 8, a condition of congestion of roads, or a travel distance.

Figures 8, 9:
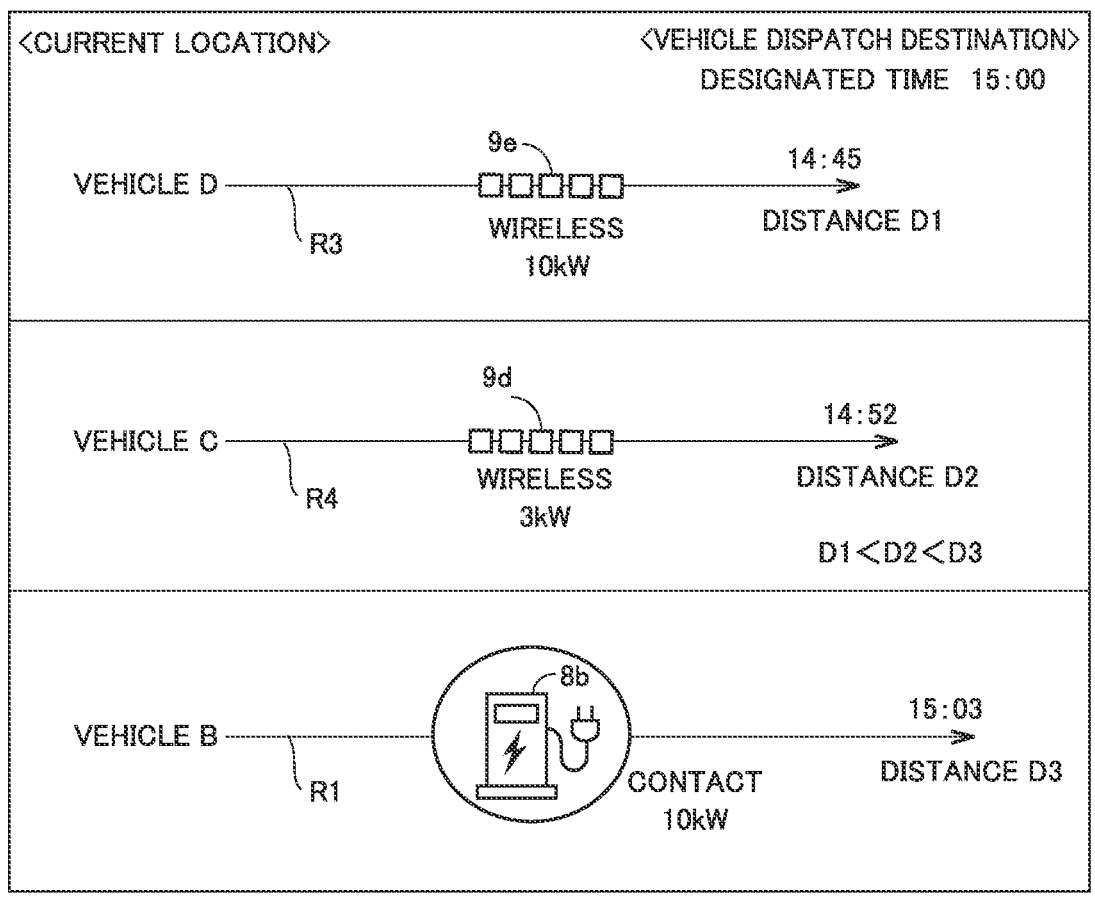
FIG. 8 is a diagram showing an exemplary selected group of dispatch candidate vehicles in the present embodiment.
FIG. 9 is a diagram showing an exemplary selected group of chargeable vehicles in the present embodiment.

It is assumed, for example, that vehicles as shown in an example in FIG. 8 are selected as the group of dispatch candidate vehicles. FIG. 8 is a diagram showing an exemplary selected group of dispatch candidate vehicles in the present embodiment. It is assumed that vehicles A to E stand by at the vehicle current location in FIG. 6 and each vehicle is ready to leave for the vehicle dispatch destination. At this time, vehicle allocation apparatus 2 is assumed to select vehicles A to E as the group of dispatch candidate vehicles. A group of vehicles that can arrive at the vehicle dispatch destination by being charged at least on the travel path is selected as the group of dispatch candidate vehicles.

Vehicle A corresponds to vehicle 1a incorporating the contact power reception apparatus (3 kW). Vehicle B corresponds to vehicle 1b incorporating the contact power reception apparatus (10 kW). Vehicle C corresponds to vehicle 1d incorporating the wireless power reception apparatus (3 kW). Vehicle D corresponds to vehicle 1e incorporating the wireless power reception apparatus (10 kW). Vehicle E corresponds to vehicle 1f incorporating the wireless power reception apparatus (30 kW).

Referring back to FIG. 7, in S23, vehicle allocation apparatus 2 determines whether or not there is vehicle 1 chargeable in the candidate for the travel path to the vehicle dispatch destination. When there is chargeable vehicle 1 (YES in S23), in S24, vehicle allocation apparatus 2 selects a group of chargeable vehicles. When there is no chargeable vehicle 1 (NO in S23), vehicle allocation apparatus 2 has the process return to the main routine.

As shown in FIG. 6, the contact power transmission apparatus (10 kW), the contact power transmission apparatus (30 kW), and the wireless power transmission apparatus (3 kW) are placed on travel path R1, travel path R2, and travel path R4, respectively. FIG. 9 is a diagram showing an exemplary selected group of chargeable vehicles in the present embodiment. Time designated by the user is 15:00.

Since vehicle D incorporates the wireless power reception apparatus (10 kW), it can be charged on travel path R3 where the wireless power transmission apparatus (10 kW) is placed. Travel path R3 is assumed to extend by a distance D1 and estimated time of arrival calculated by vehicle allocation apparatus 2 is assumed as 14:45 (in time for the designated time).

Since vehicle C incorporates the wireless power reception apparatus (3 kW), it can be charged on travel path R4 where the wireless power transmission apparatus (3 kW) is placed. Travel path R4 is assumed to extend by a distance D2 and estimated time of arrival calculated by vehicle allocation apparatus 2 is assumed as 14:52 (in time for the designated time).

Since vehicle B incorporates the contact power reception apparatus (10 kW), it can be charged on travel path R1 where the contact power transmission apparatus (10 kW) is placed. Travel path R1 is assumed to extend by a distance D3 and estimated time of arrival calculated by vehicle allocation apparatus 2 is assumed as 15:03 (later than the designated time). It is assumed that relation of distance D1<distance D2<distance D3 is satisfied.

Power reception apparatus 108 and power transmission apparatus 8 are brought in correspondence with each other as above, so that vehicle 1 in which received power (3 kW, 10 kW, or 30 kW) received by power reception apparatus 108 matches with transmitted power (3 kW, 10 kW, or 30 kW) transmitted from power transmission apparatus 8 can finally be selected as the vehicle to be dispatched, from among the plurality of vehicles 1. Thus, charging from power transmission apparatus 8 to power reception apparatus 108 can efficiently be carried out.

Referring back to FIG. 7, in S25, vehicle allocation apparatus 2 excludes vehicle 1 in the group of chargeable vehicles that will arrive later than the designated time designated by the user, from the candidates for the vehicle to be dispatched. In the example above, vehicle B that will arrive later than the designated time is excluded. Vehicle 1 that will arrive by the time designated by the user can thus reliably be dispatched.

In S26, when there are vehicles 1 that can be selected as the vehicle to be dispatched, vehicle allocation apparatus 2 selects as the vehicle to be dispatched, vehicle 1 shortest in travel distance to the location (vehicle dispatch destination) where the user gets on the vehicle. In the example above, of vehicle D and vehicle C, vehicle D shortest in distance to the vehicle dispatch destination is determined as the vehicle to be dispatched. As the travel distance is shorter, deterioration of the battery mounted on the vehicle can be suppressed.

In S27, vehicle allocation apparatus 2 gives a vehicle dispatch instruction and has the process return to the main routine. Specifically, the vehicle allocation apparatus instructs vehicle D to travel along travel path R3 to the vehicle dispatch destination.

As described above, vehicle 1 that can receive electric power from power transmission apparatus 8 on the travel path is selected as the vehicle to be dispatched, based on the power reception information including information on the power reception form of power reception apparatus 108 and the power transmission information including information on the power transmission form of power transmission apparatus 8. Thus, vehicle 1 that can suitably receive electric power from power transmission apparatus 8 on the travel path can be dispatched.

<Contact Charging and Wireless Charging>

Figure 10:
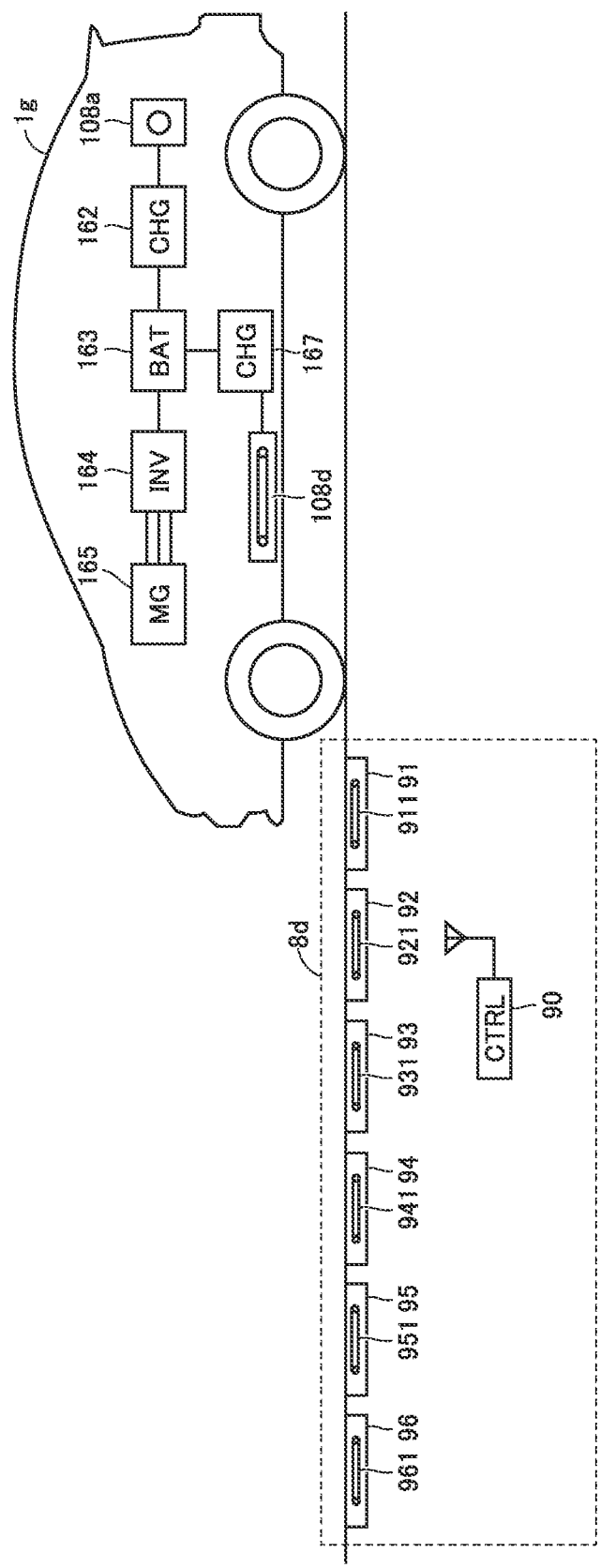
FIG. 10 is a diagram schematically showing an exemplary configuration of a vehicle including a wireless power reception apparatus and a contact power reception apparatus.

FIG. 4 shows the exemplary configuration of the vehicle including only the wireless power reception apparatus and FIG. 5 shows the exemplary configuration of the vehicle including only the contact power reception apparatus. An exemplary configuration of a vehicle adapted to both of contact charging and wireless charging will be shown below. FIG. 10 is a diagram schematically showing an exemplary configuration of vehicle 1g including wireless power reception apparatus 108d and contact power reception apparatus 108a.

Vehicle 1g includes wireless power reception apparatus 108d, power conversion device 167, battery 163 for traveling, inverter 164, motor generator 165, contact power reception apparatus 108a, and power conversion device 162.

Wireless charging is carried out as in FIG. 4. Wireless power reception apparatus 108d supplies electric power from wireless power transmission apparatus 8d to battery 163 through power conversion device 167.

Contact charging is carried out as in FIG. 5. Contact power reception apparatus 108a supplies electric power from contact power transmission apparatus 8a to battery 163 through power conversion device 162.

Battery 163 supplies electric power for generating driving force of vehicle 1g to motor generator 165. Inverter 164 converts DC power stored in battery 163 into AC power and supplies AC power to motor generator 165. Motor generator 165 has vehicle 1g travel by receiving supply of electric power from inverter 164 and providing rotational force to a drive wheel.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A vehicle allocation system, comprising:
a vehicle allocation apparatus;
a plurality of vehicles on standby; and
a terminal;
the vehicle allocation apparatus being configured to select a vehicle to be dispatched from among the plurality of vehicles on standby, the vehicle allocation apparatus comprising:
a processor; and
a memory in which a program executable by the processor is stored, wherein
each of the plurality of vehicles includes
a power reception apparatus configured to receive electric power from any one of a plurality of power transmission apparatuses,
a battery for traveling that is charged with electric power received by the power reception apparatus, and
a motor generator configured to receive electric power from the battery and provide rotational force to a drive wheel of the vehicle,
each of the plurality of power transmission apparatuses includes
a contact power transmission apparatus configured to transmit electric power through a charging cable, and
a wireless power transmission apparatus configured to wirelessly transmit electric power,
the power reception apparatus includes at least one of a contact power reception apparatus that receives electric power from the contact power transmission apparatus and a wireless power reception apparatus that receives electric power from the wireless power transmission apparatus, and
the processor is configured to:
obtain power reception information including information on a power reception form of the power reception apparatus of each of the plurality of vehicles,
obtain power transmission information including information on a power transmission form of a power transmission apparatus of the plurality of power transmission apparatuses available on each of a plurality of travel paths through which each of the plurality of vehicles can travel,
when a user makes a vehicle dispatch request, select a travel path from among the plurality of travel paths,
select as the vehicle to be dispatched from among the plurality of vehicles, such that the power reception form of the power reception apparatus of the vehicle to be dispatched matches with the power transmission form of the power transmission apparatus available on the selected travel path, and
control supply of power to the motor generator to provide rotational force to the drive wheel of the vehicle, wherein
the travel path is a path to a location where the user gets in the dispatched vehicle.

2. The vehicle allocation apparatus according to claim 1, wherein
the power reception information includes information indicating electric power received per unit time by the power reception apparatus, and
the power transmission information includes information indicating electric power transmitted per unit time by the power transmission apparatus.

3. The vehicle allocation apparatus according to claim 2, wherein
the processor selects as the vehicle to be dispatched from among the plurality of vehicles, a vehicle in which electric power received per unit time by the power reception apparatus matches with electric power transmitted per unit time by the power transmission apparatus.

4. The vehicle allocation apparatus according to claim 1, wherein
the processor is further configured to exclude from candidates for the vehicle to be dispatched, a vehicle among the plurality of vehicles that will arrive later than time designated by the user at the location where the user gets on the dispatched vehicle.

5. The vehicle allocation apparatus according to claim 1, wherein
when there are vehicles that can be selected as the vehicle to be dispatched, the processor is further configured to select as the vehicle to be dispatched, a vehicle shortest in travel distance to the location where the user gets on the dispatched vehicle.

6. A vehicle allocation method of selecting a vehicle to be dispatched from among a plurality of vehicles on standby, each of the plurality of vehicles including a power reception apparatus configured to receive electric power from any one of a plurality of power transmission apparatuses, a battery for traveling that is charged with electric power received by the power reception apparatus, and a motor generator configured to receive electric power from the battery and provide rotational force to a drive wheel of the vehicle, each of the plurality of power transmission apparatuses including a contact power transmission apparatus configured to transmit electric power through a charging cable and a wireless power transmission apparatus configured to wirelessly transmit electric power, the power reception apparatus including at least one of a contact power reception apparatus that receives electric power from the contact power transmission apparatus and a wireless power reception apparatus that receives electric power from the wireless power transmission apparatus, the vehicle allocation method comprising:
obtaining power reception information including information on a power reception form of the power reception apparatus of each of the plurality of vehicles;
obtaining power transmission information including information on a power transmission form of a power transmission apparatus of the plurality of power transmission apparatuses available on each of a plurality of travel paths through which each of the plurality of vehicles can travel;
when a user makes a vehicle dispatch request, selecting a travel path from among the plurality of travel paths;
selecting as the vehicle to be dispatched from among the plurality of vehicles, a vehicle that can receive electric power from the power transmission apparatus available on the selected travel path, based on the power reception form of the power reception apparatus of the vehicle matching with the power transmission form of the power transmission apparatus available on the selected travel path; and
controlling supply of power to the motor generator to provide rotational force to the drive wheel of the vehicle, wherein the travel path is a path to a location where the user gets in the dispatched vehicle.

* * * * *